United States Patent [19]

Mirtain et al.

[11] 3,949,797
[45] Apr. 13, 1976

[54] PNEUMATIC TIRE AND TREAD THEREFOR HAVING VARIABLE ROLLING CONTACT WITH THE GROUND

[75] Inventors: Henri Jean Mirtain; Jacques Vervin, both of Compiegne, France

[73] Assignee: Uniroyal, Clairoix, France

[22] Filed: Mar. 26, 1973

[21] Appl. No.: 344,687

[30] Foreign Application Priority Data
Apr. 7, 1972  France .............................. 72.12303

[52] U.S. Cl.. 152/209 R; 152/361 DM; 152/361 FP
[51] Int. Cl.[2] ..................... B60C 11/04; B60C 9/22
[58] Field of Search.... 152/361 FP, 209 R, 361 DM

[56] References Cited
UNITED STATES PATENTS

| | | | |
|---|---|---|---|
| 3,176,748 | 4/1965 | Giebhart | 152/209 R |
| 3,404,721 | 10/1968 | Massoubre | 152/361 FP |
| 3,554,261 | 1/1971 | Mirtain et al. | 152/361 FP |
| 3,559,712 | 2/1971 | Verdier | 152/209 R |
| 3,613,763 | 10/1971 | Fletcher | 152/361 FP |
| 3,677,319 | 7/1972 | Mirtain | 152/361 DM |
| 3,690,364 | 9/1972 | Barassi et al. | 152/361 DM |
| 3,782,438 | 1/1974 | Mirtain | 152/209 R |

Primary Examiner—Drayton E. Hoffman
Attorney, Agent, or Firm—Jay L. Chaskin

[57] ABSTRACT

A high speed pneumatic tire with a tread whose width of running contact with the ground is automatically variable. The tread consists of a central portion that is in constant contact over its entire width with the ground and two lateral shoulder portions which are respectively arranged on each side of the central portion and are each separated from the central portion by an essentially continuous circumferential groove that forms a flexible joint or coupling. Each lateral shoulder portion of the tread is radially contracted and inclined with respect to the central portion so that it contacts the ground where required by the dynamic forces on the tire, e.g., acceleration, turning and braking. The central and lateral shoulder portions of the tread each may have the same or different design patterns for particular purpose, e.g., snow, anti-skid. The tire may have a radial carcass and may also include a reinforcing breaker formed of continuous or discontinuous layers, the marginal edge portion of the breaker formed by the folding back of at least one of the layers.

10 Claims, 15 Drawing Figures

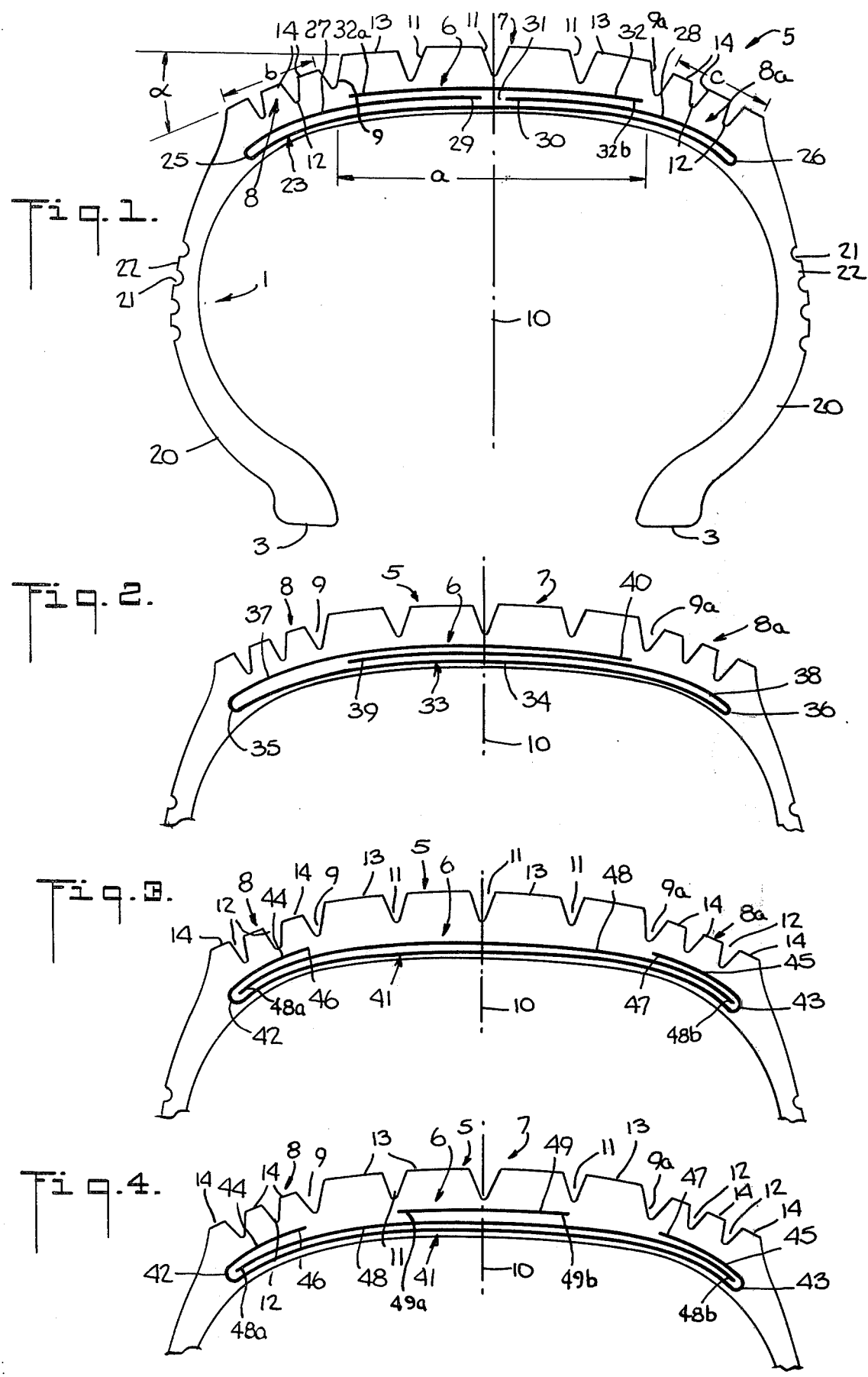

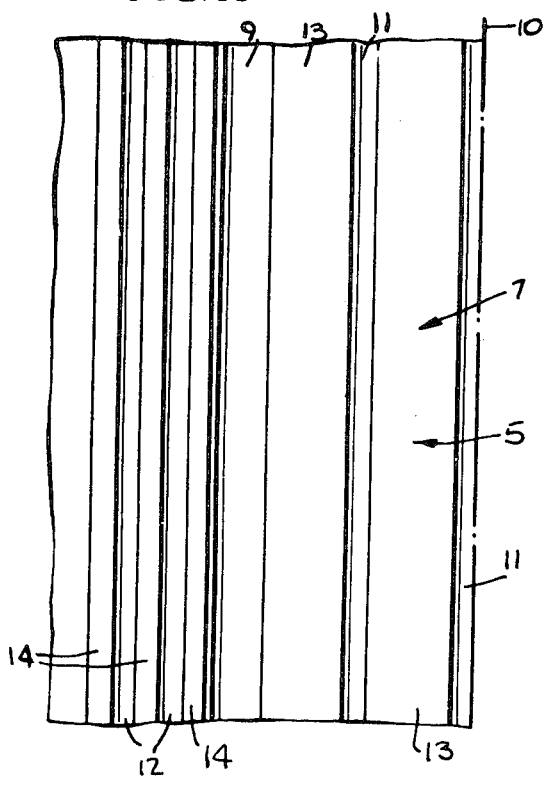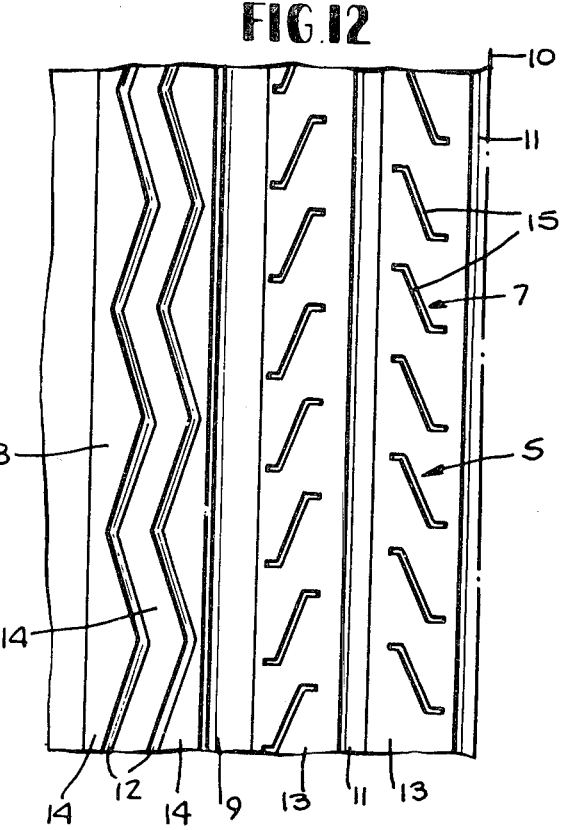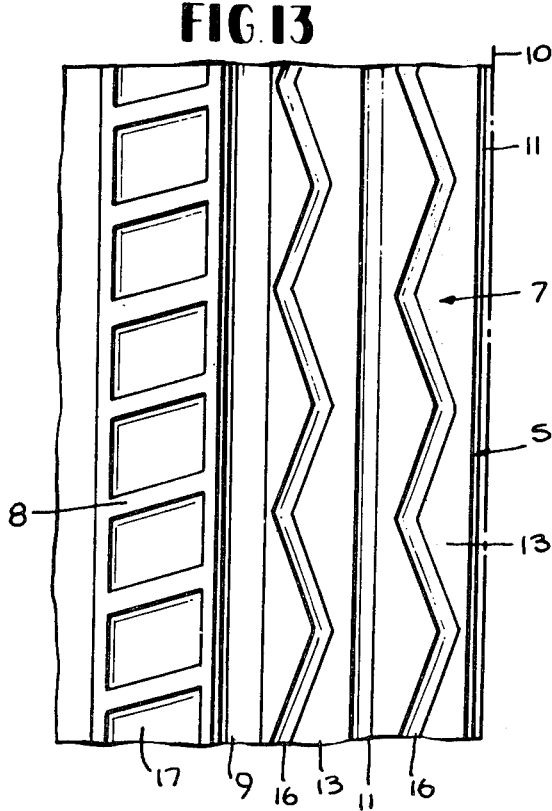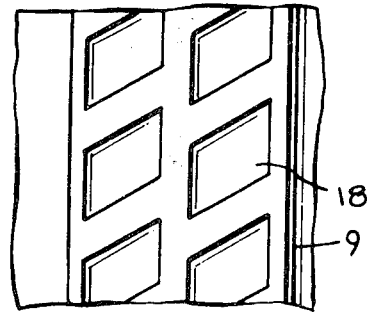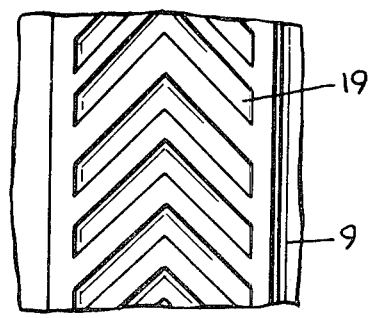

PNEUMATIC TIRE AND TREAD THEREFOR HAVING VARIABLE ROLLING CONTACT WITH THE GROUND

This invention generally concerns a pneumatic tire tread and more particularly, the contact of the tread with the ground under operating conditions.

It is known that when the tread of a pneumatic tire runs in a straight line, resistance to rolling is an increasing function of the speed of travel, whereby this resistance increases very rapidly according to an essentially exponential form with speed, particularly at high speeds, i.e., for example, speeds above 180 km per hour. The result is that at high speeds, it is important that the effective width of contact of the tread with the ground be as narrow as possible since a small contact width promotes reduction of resistance to rolling. Frictional heating of the pneumatic tire and the tread, in particular, is reduced and consequently there is less wear on the tread. Further the phenomenon known as "aquaplaning" or "hydroplaning" occurs on a surface covered with a layer of liquid, and specifically water, in which, the water cannot be evacuated fast enough from under the wheels of a vehicle travelling at a high speed by the grooves or designs in the tread of each pneumatic tire. As a consequence the tires of the vehicle are lifted or separated from the ground and are supported only by the layer of liquid, which results in the practically complete loss of adherence of the wheel to the ground, and consequently a loss of steering or directional control of the vehicle with the risk of skidding, swerving, and serious accidents. The vehicle speed at which such a dangerous phenomenon may occur is a function of various parameters or factors such as the inflation pressure of the pneumatic tire, the vehicle load on the tire, the depth of the tread design of each pneumatic tire, the effective width of running contact with the ground, etc. This critical speed at which the above-mentioned dangerous phenomenon appears is particularly a decreasing function of the effective width of running contact of each pneumatic tire with the ground. When the critical speed is higher, the smaller the effective width of running contact with the ground or the narrower the tread. A small effective width of running contact is therefore preferable for decreasing the risk of the appearance of the "aquaplaning" phenomenon.

It can be stated, however, if the effective width of running contact is small or if the tread is narrow, the pressure in the area of contact with the ground is generally higher. In addition, a narrow tread generally is not favorable from the viewpoint of safety of a pneumatic tire or vehicle behavior during turning. During a turning motion at a relatively high speed, for example, when the vehicle is negotiating a curve, the centrifugal force and possibly other passive forces of inertia or the lateral or transverse reaction acting on each pneumatic tire, tend to make the tire tilt to the side, so that a portion (radially internal with respect to turning) of the tread of each pneumatic tire, which is initially in contact with the ground, rises and separates from the ground. The tread no longer adheres to the ground except by a relatively small portion (radially exterior with respect to turning), and hence the serious risk of skidding. This risk of skidding is greater with pneumatic tire treads which have projecting shoulders than with pneumatic tire treads which have rounded shoulders. Consequently, a narrow tread, i.e., a small effective width of running contact, is generally undesirable to the safety of travel during turning.

It is therefore seen that the requirements or conditions for maintaining an optimum route or optimum behavior of an automobile vehicle are contradictory and relatively incompatible for straight-line travel and turning, since in straight-line travel it is important that the effective width of running contact with the ground or the tread of each pneumatic tire tread be as narrow as possible, while it must, in contrast, be as wide as possible for turning motion.

It is the principal object of the present invention to provide an improved high-speed tire.

It is an object of the present invention to provide a pneumatic tire tread for automobile vehicles designed to travel at a high speed (at least equal to or greater than 180 km per hour) whose effective width of running contact with the ground would be automatically variable. It is a further object of the present invention to provide a pneumatic tire which is relatively narrow during straight-line travel (to decrease resistance to rolling) and relatively wide during turning motion (to increase safety against skidding).

According to the invention a pneumatic tire has a tread whose width of running contact with the ground is automatically variable and which comprise a central portion designed to be in contact over its entire width with the ground and two lateral shoulder portions designed to be in temporary contact with the ground. The two lateral portions are respectively arranged on each side of the central portion and each separated from the other by an essentially continuous circumferential groove. Each lateral shoulder portion is radially contracted with respect to the central portion in order to project less toward the outside than the central portion. This tread construction provides that, during straight-line travel, the tread contacts the ground only by its central portion, i.e., by a relatively narrow zone, whereas during a highspeed turning motion, the lateral shoulder portion, which is on the radially external side with respect to turning, makes temporary contact with the ground by a corresponding deformation of the tire tread. Thus the effective surface of running contact with the ground is wider because of the simultaneous contact of the central portion and one lateral shoulder portion of the tread with the ground.

In one embodiment of the invention, where the tread is provided with circumferential grooves that are continuously spaced and at least approximately parallel, each of the lateral shoulder portions of the tread has circumferential grooves and the groove that separates each lateral shoulder portion of the abovementioned central portion is transversely wider than and at least a deep as the other grooves. The presence of this wide groove at the junction of each lateral shoulder portion with the central portion of the tread provides a flexible joint coupling that promotes separation of each lateral shoulder portion relative to the central portion.

According to a further embodiment of the invention, the tire has a radial carcass with a breaker that forms a reinforcing belt, the belt extending transversely under the lateral shoulder portions at least over the major part of their width, the marginal edges of a layer forming the belt having folded back portions.

According to still a further embodiment of the invention, superimposed over the folded back breaker layer is an annular cover strip.

According to still another embodiment of the invention, the cover strip may be disposed so that the marginal edges of the folded back portion lie under the strip.

According to still another embodiment of the invention, the folded back portions may be folded in radially opposite directions.

According to a further embodiment of the invention, the reinforcing breaker may include a supplementary ply layer, the folded back portions being laid over the supplementary ply layer.

Reinforcing belt or breaker structures, with or without folded back marginal portions, provide a stabilizing effect on the tire during operating conditions which tend to cause deformations at the shoulders, a high degree of flexing in the sidewalls and in the carcass ply layers. Such operating conditions include braking, acceleration or decelerations, centrifugal forces when turning or high speeds in a straight line of travel. Stabilizing such deformations and flexing contributes to riding comfort, increased tread wear and reduces stresses which may cause ply separation and other tire failures.

Under normal operating conditions, the tire tread according to this invention, i.e., at a generally constant speed with approximately uniform rectilinear travel of the vehicle without acceleration or braking, the tread contacts the ground only with the central portion. Under variable operating conditions, particularly under the effect of braking or acceleration during, for example, straight-line motion, at least one portion of the lateral shoulder portions makes contact with the ground because of the dynamic forces acting on the tire tread. Thus, the total area of contact with the ground is increased, and therefore the adherence of the wheel to the ground.

The improved tread according to the invention, having a central portion and two lateral shoulder portions, is preferably essentially symmetrical relative to the equatorial or median plane perpendicular to the geometric axis of rotation or revolution of the tire. However, the tread also may be non-symmetrical, i.e., asymmetrical, where for example, the tire is intended for use in racing cars or competition sports cars and is to be driven at closed-loop race tracks in one permenent circular direction which is always relatively the same as the direction of rotation of the car around the closed loop.

The tire tread according to the invention is also very advantageous for driving in snow and over soft terrain. In hard snow, a narrow tread is preferable and, the tire tread bears on the ground only with its central portion. In soft snow or over soft terrain, in contrast, a wide tread is preferable, so that the tire tread simultaneously bears with its central portion and at least a part of its lateral shoulder portions. In soft snow or over soft terrain, the central portion of the tread of the pneumatic tire particularly serves to support the tire while the tractional force of the wheel is transmitted to the ground essentially by the sides or lateral shoulder portions.

The invention will be better understood and other purposes, characteristics, details, and advantages will appear more clearly upon reading the explanatory description that follows in reference to the attached schematic drawings, which are given only as nonlimiting examples to illustrate the various embodiments of the invention and in which:

FIG. 1 represents a radial cross-sectional profile view of a pneumatic tire according to one embodiment of the invention which comprises a folded reinforcing breaker layer, the marginal edges of which are spaced from one another and a radially external symmetrical cover strip;

FIG. 2 is a partial cross-sectional view of the tire, which shows another embodiment with a single reinforcing belt layer having overlapping folded back marginal portions;

FIG. 3 is a partial cross-sectional view of the tire which represents an embodiment comprising a reinforcing belt layer and superimposed symmetrical supplementary belt layer, the marginal portions of the reinforcing belt being folded back such as to lie over the supplementary belt layer;

FIG. 4 is a partial cross-sectional view similar to FIG. 3, showing a modification in which the reinforcing breaker further includes a narrow cover strip located symmetrically under the central portion of the tread and axially between the marginal edges of the folded portions;

FIG. 11 is a partial top view expanded in the plane of a lateral shoulder portion and a part of the central portion of the tread according to the invention which contains designs in an essentially rectilinear lined configuration;

FIG. 12 is a partial top view, expanded in the plane of the tread which shows a zig-zag design in the lateral shoulder portion and a rectilinear design in the central portion with antiskid slots or ridges;

FIG. 13 is a partial top view expanded in the plane of the tread which shows a block-configuration design in the lateral shoulder portion and a zig-zag and rectilinear design in the central portion of the tread;

FIG. 14 represents a partial top view of a lateral shoulder portion of the tread with pavement-shaped designs; and FIG. 15 is a partial top view of a lateral shoulder portion of the tread, which shows designs having a transverse chevron configuration.

Figure 5:
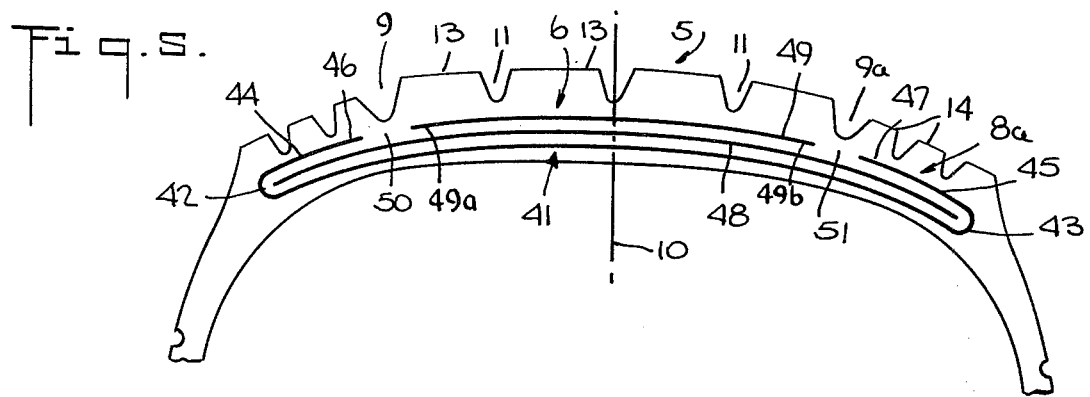
FIG. 5 is a partial cross-sectional view similar to FIG. 3, showing a modification in which the reinforcing breaker further includes a wide cover strip which extends transversely substantially for the width of the central portion of the tread.

According to the embodiment example represented in FIG. 1, the tire has a radial carcass 1 that includes one or more layers of corded fabric cemented to wires or threads oriented in radial planes perpendicular to the equatorial plane 10 of the tire and extending between bead areas 3, the carcass ply is turned back or folded back at its respective ends, for example, to the outside around each bead wire. The tire has a tread 5, and located between the tread and the carcass ply is a reinforcement 6 that forms an essentially rigid or inextensible reinforcing breaker.

The tread 5 is subdivided transversely into three parts that comprise a central portion 7 and two lateral shoulder portions 8, 8a. Each of the lateral shoulder portions is separated from the central portion 7 by a circumferential peripheral groove 9, 9a that is relatively wide and deep, which respectively constitutes a flexible joint or coupling means for each lateral shoulder portion with the central portion. Each lateral shoulder portion 8, 8a of width b, c, is advantageously contracted with respect to the central portion 7 of width a, i.e., it projects less radially to the outside than the latter. The tread 5 may be symmetrical relative to the equatorial plane 10 of the tire, in which both lateral shoulder portions 8, 8a are essentially identical and have the same width $b = c$. The tread 5 may be non-symmetrical, in which both lateral shoulder portions 8, 8d are thus unlike and may have different and unequal widths as well as different designs.

Each of the three parts of the tread 5 has designs, for example, in the form of grooves 11, 12, which are spaced transversely, and extend in a generally circumferential direction about the tire tread, and projecting ribs 13, 14 between them. The grooves 9, 9a which separate one respective lateral shoulder portion from the central portion of the tread, are transversely wider than and at least as deep as the other grooves 11, 12. Grooves 9, 9a, 11 and 12 provide a means for water evacuation from under the tire tread.

The exterior middle section of sidewalls 20 of the pneumatic tire are provided with circular channels 21 that border circular projecting ribs 22. The channels 21 and ribs 22 provide each sidewall 20 with flexibility or elasticity, which reduces the risk of slipping or skidding during turning. The sidewall flexes first before lifting the adjacent lateral shoulder portion under the effect of transverse or centrifugal dynamic forces.

Each lateral shoulder portion 8 or 8a of the tread 5 is inclined relative to a plane tangent to the middle of the central portion, at an angle $\alpha$ whose value may be between 10° and 30°, and is preferably equal to 25°.

In a typical construction, the transverse width of the central portion 7 of the tread 5 represents, for example, approximately 51% of the total maximum width of the tire tread in the unloaded, inflated state, whereas the width of each lateral shoulder portion 8, 8a represents approximately 20% of this total maximum width and the width of each groove 9, 9a represents approximately 4.5% of the total width.

According to the embodiment illustrated in FIG. 1, the reinforcing belt 6, located between the carcass 1 and the tread 5, comprises an annular ply layer 23 folded back radially bilaterally toward the outside, for example, symmetrically with respect to the equatorial plane 10. The marginal folded back portions 27 and 28 extend transversely across the crown region toward the equatorial plane 10 but do not overlap. Each folded back portion 27, 28 has a transverse width less than one-half the transverse width of the underlying intermediate portion 24 connecting the folded back portions. The opposite marginal axially inward edges 29, 30 of the folded back portions 27, 28 are thereby axially spaced apart from one another by a space 31 forming a transverse discontinuity symmetrical with the equatorial plane 10.

Extending transversely across the discontinuity space 31 is an annular cover strip 32. The transverse width of the cover strip 32 is less than the total transverse width of folded breaker 23 as measured between marginal folded edges 25 and 26. The cover strip 32 is disposed radially external of the folded breaker 23 and is preferably substantially symmetrical with respect to the equatorial plane 10. Cover strip 32 extends transversely preferably only beneath the central portion 7 of the tread 5 and has a width between marginal free edges 32a, 32b, substantially equal to the central portion 7 such that the strip extends between the circumferential peripheral grooves 9, 9a which define the central portion 7.

According to another embodiment as shown in FIG. 2, the reinforcing belt 6 comprises a single ply layer 33 having portions 37 and 38 which are radially externally folded back. Each folded back portion 37, 38 has a transverse width as measured between respective marginal folded edges 35, 36 and marginal free edges 39, 40 greater than one half of the width of the underlying intermediate portion 34 of the belt layer 33. The folded back portions 37, 38 therefore mutually overlap, the overlapped width being equal and preferably symmetrical with respect to the equatorial plane 10. The marginal free edge 39, 40 of each folded back portion 37, 38 is preferably located in proximity with the radial plane containing the circumferential peripheral groove 9, 9a which is situated at that portion of the tread S axially opposite to the marginal folded edges 35, 36. The reinforcing cords of the belt layer 33 can be formed in the same manner as the belt layer 23 of FIG. 1. The reinforcing cords of belt layer 33 can be inclined to the equatorial plane at a bias angle within the range of between 12° and 30°.

In FIG. 3 the belt 6 comprises a ply layer 41 which is folded back bilaterally in a radially external direction, the folded back portions 44, 45 preferably being symmetrically with respect to equatorial plane 10. The folded back portions 44, 45, respectively, extend under the two lateral shoulder portions 8, 8a of the tread 5 and have a transverse width at least equal to the width of the shoulder portions 8, 8a. A supplementary belt ply layer 48 superimposed concentrically over the layer 41, and between the marginal folded edges 42, 43 such that the marginal free edges 46, 47 of the folded back portions 44, 45 are respectively folded around the marginal free edges 48a, 48b of the supplementary belt ply layer 48. The supplementary layer 48 transversely extends at least approximately over the same width as the belt layer 41, the belt layer 41 having a transverse width as measured between marginal folded edges 42, 43 substantially equal to the width of tread 5.

FIG. 4 shows a belt layer 41 and a supplementary belt ply layer 48 similar to FIG. 3 and further includes a cover strip 49. Cover strip 49 is positioned radially externally of the belt layers 41 and 48 and extends transversely between the marginal free edges 46, 47 of the belt layer 41. Cover strip 49 is disposed symmetrical to plane 10 and beneath the portion 7 of the tread 5. In FIG. 4, cover strip 49 has a width, as measured between marginal free edges 49a, 49b, less than that of the central portion 7. In the embodiment shown in FIG. 5, the transverse width of the cover strip 49 between edges 49a, 49b is substantially equal to that of the central portion 7 of the tread 5. Between the marginal free edges of the cover strip 49 and the marginal free edges 46, 47 of belt layer 41 is a spacing interval 50, 51. Spacing intervals 50, 51 are located directly beneath and opposite grooves 9, 9a that separate the lateral shoulder portions 8, 8a of the tread 5 from the central portion 7.

Figure 6:
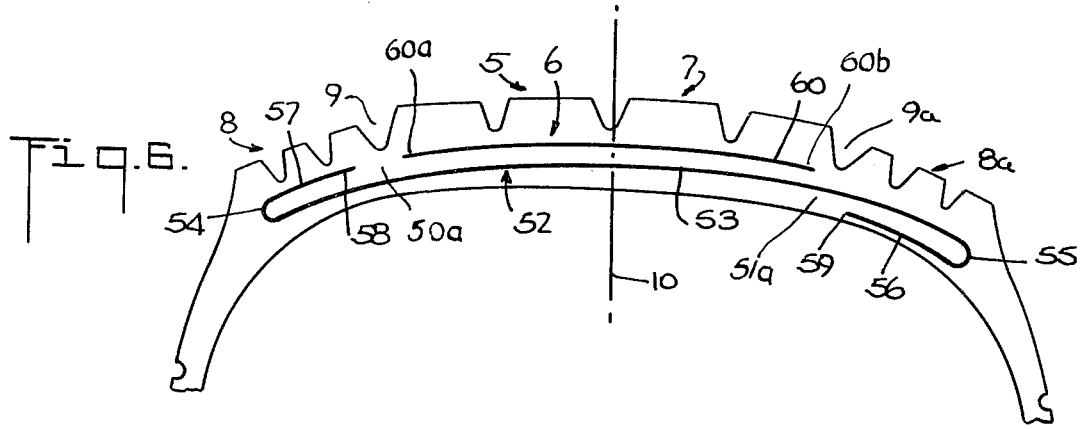
FIG. 6 is a partial cross-sectional view in which the reinforcing belt layer has marginal edges folded back portions, the folded back portions being radially internal and external of the intermediate belt portion, and a superimposed cover strip.

In FIG. 6 the belt 6 comprises at least one belt ply layer 52 having axially opposite marginal edges 58, 59 folded at 54, 55 of the intermediate portion 53 to form folded back portions 56, 57. Folded back portion 56 is folded so as to be radially internal of the intermediate portion 53 whereas folded back portion 57 is folded so as to be radially external of the intermediate portion 53. The transverse widths of the folded back portions 56, 57 are equal, and the sum of these widths is less than that of the transverse width of the intermediate portion 53. A cover strip 60 is superimposed concentric and radially externally of the belt ply 52. Cover strip 60 extends transversely under the central portion 7 of the tread 5 substantially over a width, as measured between marginal free edges 60a, 60b, at the most equal to that of the central portion 7. Between the marginal free edges 60a, 60b of the cover strip 60 and the marginal free edges 58, 59 of the ply 52 is a spacing interval 50a, 51a. In FIG. 6, the folded back portions 56, 57, extend transversely under respective lateral shoulder portions 8, 8a over a width at the most equal to that of the shoulder portions 8, 8a.

Figure 7:
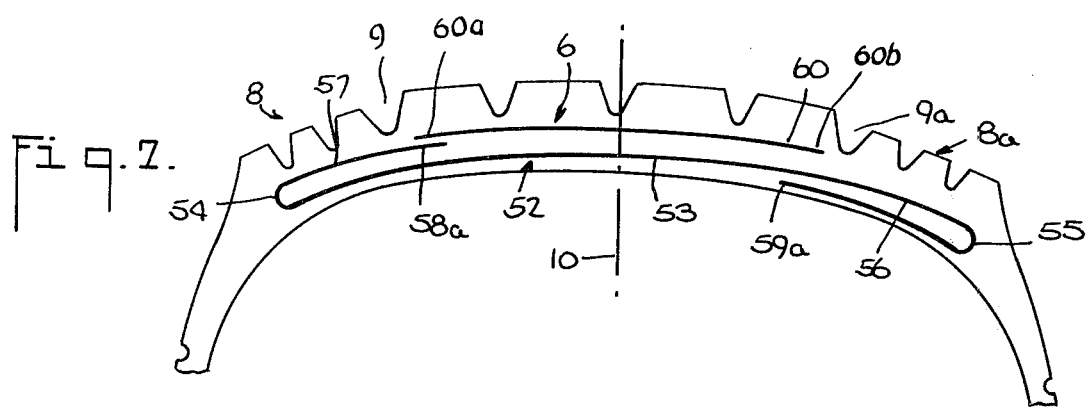
FIG. 7 is a partial cross-sectional view, similar to FIG. 6, in which the edges of the folded back portions extend transversely under the cover strip.

FIG. 7 shows a reinforcing belt 6 having a belt ply 52 and a cover strip 60 similar to that of FIG. 6, however the width of each folded back portion 56, 57 is greater than that of the corresponding lateral shoulder portion 8, 8a. The marginal free edges 58a, 59a extend under the central portion 7. As shown, therefore, the marginal free edges 60a, 60b of the cover strip 60 overlaps the respectively marginal free edges 58a, 59a of each folded back portion 56, 57.

Figure 8:
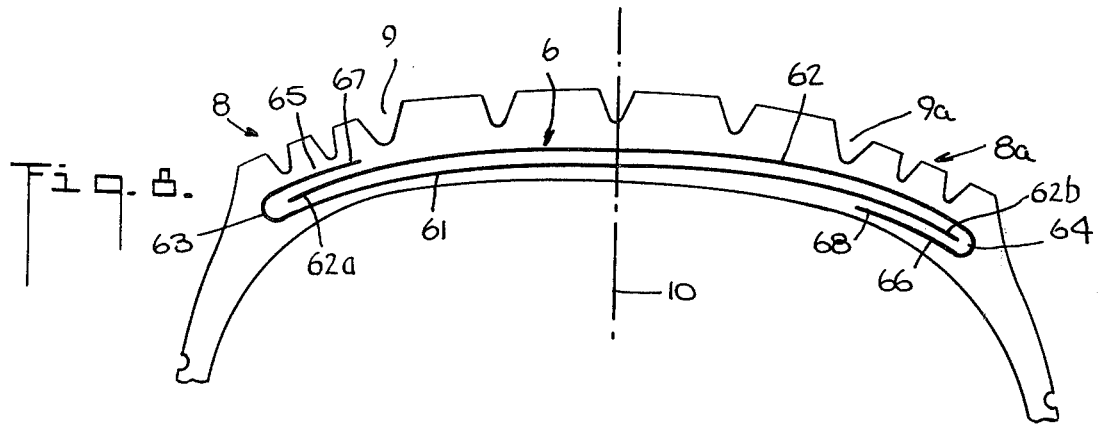
FIG. 8 is a partial cross-sectional view, similar to FIG. 3, in which the reinforcing belt layer has marginal edges folded back portions, the folded back portions being radially internal and external of the intermediate belt portion and lie respectively, over and under the marginal edges of a supplementary ply layer.

FIG. 8 represents a further embodiment in which the reinforcing belt 6 comprises two concentrically superimposed layers 61 and 62, having substantially equal widths. The belt ply 61 has fold at 63, 64 to form folded back portions 65, 66 similar to the folded back portions 56, 57 of the belt ply 52 in FIG. 6. The folded back portions 65, 66 are each folded around the marginal free edges 62a, 62b of the supplementary ply 62. Each folded back portion 65, 66 extends transversely, as measured from the fold 63, 64 to the marginal free edge 67, 68, under the lateral shoulder portion 8, 8a over a width at least equal to or greater than the width of the respective lateral shoulder portion.

Figure 10:
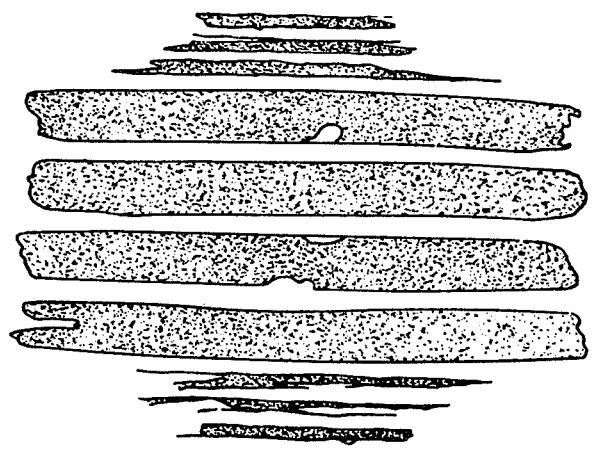
FIG. 10 shows the outline or impression on the ground by a tire tread according to the invention, which contacts simultaneously with the central portion and at least one part of the lateral shoulder portions of the thread.
Figure 9:
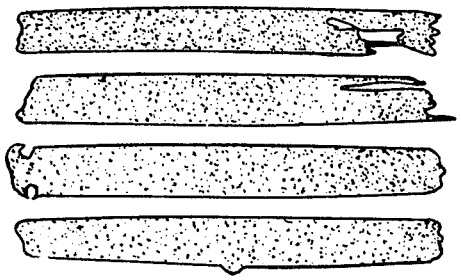
FIG. 9 represents the outline or impression on the ground by the tire tread according to the invention which contacts only with the central portion of its tread.

The tread according to the invention with a design such as that of FIG. 11 (to be described) causes the track or imprint on the ground shown in FIG. 9. In FIG. 9 only the central portion 7 of the tread 5 is in contact with the ground. FIG. 10 shows the track or impression when the central portion 7 and a major part of the lateral shoulder portions 8, 8a of the tread are simultaneously in contact with the ground. A comparison of FIGS. 9 and 10 shows that the effective bearing capacity of the tread is considerably increased with respect to the track represented in FIG. 9.

FIGS. 11, 12 and 13 represent several different possible configurations of the designs in the tread 5. In FIG. 11, the central portion 7 and the lateral shoulder portion 8 of the tread 5 have a rectilinear lined configuration, i.e., longitudinal or circumferential grooves 11, 12. The grooves 11, 12 are situated in planes parallel to the equatorial plane 10 of the tire and adjacent respective projecting ribs 13, 14. This design which is well suited for driving over hard ground, is less favorable for traction in soft terrains.

In FIG. 12, the central portion 7 of the tread 5 is provided with antiskid slots, grooves, projections, ribs or ridges 15 in the ribs 13, whereas the lateral shoulder portion 8 has a zig-zag pattern formed by broken or crooked grooves 12 between the ribs 14. In FIG. 13, the central portion 7 of the tread has a combination of zig-zag grooves 16 disposed in the ribs 13 and rectilinear grooves 11, whereas the lateral shoulder portion 8 has a blocked design 17. Other design configurations are also possible, separately or in combination with the preceding configurations. For example in the lateral shoulder portion, pavement configurations 18 as in FIG. 14 or transverse chevron or lateral block 19 configurations as in FIG. 15. It should be noted that the tread designs shown in FIGS. 11, 12 and 13 are shown as being on the left of the equatorial plane 10. The design is repeated on the right side of the equatorial plane 10, where it may be the same as or different than the design on the left side of the equatorial plane. Furthermore, the tread configuration shown in FIGS. 1, 2, 3, 4, may be any of the tread designs shown in FIGS. 11 to 15 or any combination thereof.

As used herein, the term "cords" means cords, threads, filaments, wires, cables or the like, and whether twisted or untwisted. Such cords may be metallic, for example, steel, or non-metallic, for example, glass or textile. The textile may be natural or synthetic, for example, rayon, polyester or nylon or Fiber B.

The reinforcing cords of either the folded breaker, the cover strip or the supplementary ply can be made of steel or the reinforcing cords of either the folded breaker or the supplementary ply or the cover strip can be of a different material. The reinforcing cords of the folded breaker or the supplementary ply or the strip can be of identical configuration or they can differ in thickness and/or their structure, and/or their mechanical resistance or tenacity. The reinforcing cords of each of the folded breaker, the supplementary ply or the cover strip are parallel and are oppositely oriented to the equatorial plane 10 at equal or unequal bias angles.

The oppositely oriented equal bias angle is in the range between 14° and 25° and preferably is approximately 20°. Where the oppositely oriented bias angles are unequal, the range of the angles for the reinforcing cords of the radially internal or at least one folded breaker ply can be between 14° and 25° whereas that of the reinforcing cords of the radially external or unfolded ply can be in the range of between 10° and 45°. Although the embodiments disclosed herein are generally symmetrical with respect to the equatorial plane 10, a asymmetrical arrangement, either in bias angle or transverse width orientation is possible.

It is understood that the invention is not limited solely to the embodiments described and represented, which were given only as examples. In particular, it includes all means that constitute technical equivalents of the means described, as well as their combinations, if the latter are carried out in the spirit of the invention.

The scope of the invention is to be determined, therefore, by the attached claims.

Having thus described our invention, what we desire to secure and claim by Letters Patent is:

1. A high speed pneumatic tire comprising a tread having a road contact central portion symmetrical to an equatorial plane of the tire;

first and second shoulder portions being spaced respectively, laterally of the central tread portion by a continuous circumferentially extending groove and at an angle to the central portion within the range of 10 to 30°, the shoulders each having a tread of a radially variable lesser extent than the central tread portion;

the first and second shoulder portions forming with the central portion the entire width of the tread surface, the tread surface forming said first and second portions having a width in variable contact with the road;

a reinforcing breaker located under the tread extending transversely under the first, second and central portions;

said breaker comprising at least one layer having marginal free edges folded back toward the equatorial plane to form folded back portions radially external of an intermediate portion of the breaker layer, each having a folded edge;

each of said folded back portions having a width at least equal to the width of a respective one of the shoulder portions;

each said folded back portion located under one of the respective shoulder portions;

each folded edge extending laterally only into a respective shoulder portion;

said breaker further comprising an annular supplementary ply layer, the folded back portions being folded around respective marginal free edges of the supplementary ply layer.

2. A tire according to claim 1 wherein the reinforcing breaker further comprises an annular cover strip, said cover strip being radially external of the folded breaker layer, said cover strip having a transverse width at least equal to the width of the central tread portion.

3. A tire according to claim 2 wherein the folded breaker layer and the annular cover strip each have reinforcing elements of the same material.

4. A tire according to claim 2 wherein the folded breaker layer and the annular cover strip each have reinforcing elements of different material.

5. A tire according to claim 1 wherein the folded breaker layer and the supplementary ply layer each have reinforcing elements of the same material.

6. A tire according to claim 1 wherein the folded breaker layer and the supplementary ply layer each have reinforcing elements of different material.

7. A tire according to claim 2 wherein the folded breaker layer, the cover strip and the supplementary ply layer each have reinforcing elements of the same material.

8. A tire according to claim 2 wherein the folded breaker layer, the cover strip and the supplementary ply layer each have reinforcing elements of different material.

9. A tire according to claim 1 wherein the range of said angle is less than 30° but at least 10°.

10. A tire according to claim 1 wherein the angle is approximately 25°.

* * * * *